US007549272B2

(12) United States Patent
DeFedericis

(10) Patent No.: US 7,549,272 B2
(45) Date of Patent: Jun. 23, 2009

(54) SORBENT CANISTER WITH BEVELED EDGES

(75) Inventor: Allen DeFedericis, Alden, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 303 days.

(21) Appl. No.: 11/735,752

(22) Filed: Apr. 16, 2007

(65) Prior Publication Data

US 2008/0251395 A1 Oct. 16, 2008

(51) Int. Cl.
 *B65B 7/28* (2006.01)
(52) U.S. Cl. .................... 53/452; 53/329.5; 53/459; 53/478; 156/69; 156/267; 96/108
(58) Field of Classification Search ............ None
 See application file for complete search history.

(56) References Cited

U.S. PATENT DOCUMENTS

| 3,799,820 | A | * | 3/1974 | Sollerud | 156/69 |
|---|---|---|---|---|---|
| 4,093,105 | A | | 6/1978 | Russell et al. | |
| 4,772,300 | A | | 9/1988 | Cullen et al. | |
| 5,186,775 | A | * | 2/1993 | Cullen et al. | 156/69 |
| 5,503,662 | A | | 4/1996 | Berger | |
| 5,641,088 | A | | 6/1997 | Berger | |
| 5,716,432 | A | * | 2/1998 | Perrine | 96/135 |
| 5,730,785 | A | | 3/1998 | Idol et al. | |
| 5,816,438 | A | | 10/1998 | Berger | |
| 5,824,140 | A | | 10/1998 | Berger | |
| 5,833,784 | A | | 11/1998 | Berger | |
| 5,879,490 | A | | 3/1999 | Berger | |
| 5,942,060 | A | | 8/1999 | Berger | |
| 6,234,386 | B1 | * | 5/2001 | Drummond et al. | 229/123.2 |
| 6,929,682 | B2 | | 8/2005 | Hurley et al. | |
| 7,037,393 | B2 | * | 5/2006 | Drummond et al. | 156/73.1 |
| 2003/0097824 | A1 | * | 5/2003 | Mayer et al. | 53/478 |

OTHER PUBLICATIONS

International Search Report for International Patent Application No. PCT/US2008/057486.
Written Opinion of the International Searching Authority for International Patent Application No. PCT/US2008/057486.

* cited by examiner

*Primary Examiner*—Duane Smith
*Assistant Examiner*—Christopher P Jones
(74) *Attorney, Agent, or Firm*—Stephen B. Salai; Thomas B. Ryan; Harter Secrest & Emery LLP

(57) ABSTRACT

A sorbent canister having a hollow body and porous end caps fused to opposite ends of the hollow body includes beveled surfaces at the fused sites to aid in the dispensing of the canisters into product packaging.

18 Claims, 5 Drawing Sheets

SORBENT CANISTER WITH BEVELED EDGES

TECHNICAL FIELD

The invention relates to gas or vapor permeable canisters for containing gas or vapor treating materials, including adsorbent or absorbent materials such as a desiccant or an oxygen absorber and to the manufacture of such gas or vapor permeable canisters.

BACKGROUND OF THE INVENTION

Sorbent canisters, also referred to as sorbent cartridges, perform various absorbing or adsorbing functions for regulating the gas or vapor content of confined environments, such as product packaging. For example, sorbent canisters, such as disclosed in U.S. Pat. Nos. 4,093,105, 4,772,300, and 5,503,662, have been inserted into pharmaceutical packaging, such as pill bottles, to lessen contamination or deterioration of the pharmaceuticals by exposure to moisture or oxygen.

Generally, the canisters have a hollow moisture-impeding plastic cylindrical body and separate porous end caps, and the canisters are filled with granular sorbent of various types for adsorbing moisture or absorbing gases from pharmaceutical containers or other forms of packaging. For example, the canister disclosed in U.S. Pat. No. 4,772,300 features web-bonded polyethylene end caps secured to the ends of a polyethylene body by means of ultrasonic welding. Other such sorbent canisters include the canisters disclosed in U.S. Pat. Nos. 4,093,105 and 5,503,662, which are also arranged for insertion into pharmaceutical containers for the purpose of preventing deterioration of their pharmaceutical contents from moisture. In addition to protecting pharmaceuticals, certain other materials, such as pills, diagnostic test strips, and certain granular substances, which are packed in containers, have similarly benefited from the presence of a material-treating substance to adsorb moisture or absorb oxygen or odors in order to preserve the integrity of those materials.

The sorbent canisters are typically inserted into pharmaceutical bottles or other containers, whose other contents require some form of environmental regulation, by dispensing mechanisms associated with high-speed filling operations. Although the typical sorbent canisters are manufactured to meet dimensional tolerances set for use with the canister dispensing mechanisms, edges formed between the porous end caps and the hollow moisture-impeding plastic cylindrical bodies can sometimes interfere with the dispensing operations.

During known canister fabricating operations, such as disclosed in U.S. Pat. No. 5,942,060, the porous end caps are fused by vibratory welding energy or by heat sealing to the hollow cylindrical bodies and are subsequently trimmed to remove excess material beyond the fusion sites. However, normal dimensional and processing variations within the specified tolerances can leave irregular edges or overhangs that can interfere with the dispensing operations. For example, the irregular edges or overhangs can cause the sorbent canisters to hang up or bind to conveyance structures within the dispensing mechanisms.

SUMMARY OF THE INVENTION

The invention in one or more of its preferred embodiments treats edges of sorbent canisters to overcome the dispensing problems of prior sorbent canisters. The typical sorbent canisters have porous end caps fused to hollow moisture-impeding plastic cylindrical bodies. Although the fused end caps are generally cut to match the perimeter shape of the hollow cylindrical bodies, outer peripheral edges of the resulting canisters are further treated in accordance with the invention to remove any material that might extend beyond the intended perimeters of the hollow cylindrical bodies. Preferably, the peripheral edges of the canisters are chamfered or otherwise beveled or rounded to remove or recess excess material.

One version of the invention as a method of fabricating a sorbent canister includes the steps of overlaying a first porous plastic sheet across a first open end of a hollow moisture-impeding plastic body and fusing the first sheet to the first open end of the hollow body. The portion of the first sheet that is surrounded by a first fused junction between the first sheet and the first open end of the hollow body forms a first end of the canister. The remaining portion of the first sheet that extends beyond the first fused junction is trimmed away for separating the canister from the first sheet. The first fused junction is then chamfered for beveling the first end of the canister. The beveled end overcomes tolerance variations in the trimming operations that can leave irregular edges that can interfere with the automated dispensing of the completed canisters.

Preferably, the hollow body has a form concentric to an axis, and the step of chamfering includes forming in the first end of the canister a beveled surface inclined to the axis. In addition, the step of chamfering preferably includes rotating a tool around the axis. The tool preferably includes blades angularly spaced around the axis. The beveled surface, such as can be formed by the rotating tool, is oriented concentric to the axis and is preferably inclined to the axis by a chamfer angle of less than 30 degrees. Even more preferably, the beveled surface is inclined by a chamfer angle of only approximately 15 degrees. The shallow chamfer angles assure that the chamfering operation does not compromise wall thickness of the hollow body despite height variations in the canisters. For example, a chamfer angle at 15 degrees can accommodate nearly four times the hollow body height variation as a more conventional chamfer angle at 45 degrees.

Once the first end is formed on the canister, the canister is inverted, filled with a reactant (i.e., an adsorbing or absorbing material) and a second porous plastic sheet is lain across a second open end of the hollow moisture-impeding plastic body. The second sheet is fused to the second open end of the hollow body, and a surrounding portion of the second sheet that extends beyond a second fused junction is trimmed away for separating the canister from the second sheet. The second fused junction is then chamfered for beveling the second end of the canister. Together, the two beveled ends remove irregular edges that can interfere with the automated dispensing of the completed canisters in either of two opposite axial orientations of canisters.

Preferably, the hollow moisture-impeding plastic body is a first of a plurality of hollow moisture-impeding plastic bodies. The plurality of hollow plastic bodies can be mounted in a common pallet, the second open ends of the hollow bodies can be aligned within the pallet to a common reference, and the first sheet can be fused to the first open end of the hollow bodies for forming the first fused junctions at the first ends of the canisters. The remaining portions of the first sheet that extend beyond the first fused junctions are collectively trimmed away for separating the canisters from the remaining portions of the first sheet. In addition, the first fused junctions are collectively chamfered for beveling the first ends of the canisters.

Once the first ends of the canisters are formed, the pallet can be inverted, the first ends of the canisters can be aligned to a common reference, and the canisters can be filled. The second sheet can be fused to second open ends of the hollow bodies for forming second fused junctions at second ends of the canisters. Remaining portions of the second sheet that extend beyond the second fused junctions can be collectively trimmed away for separating the canisters from the remaining portions of the second sheet. Then, the second fused junctions can be collectively chamfered for beveling the second ends of the canisters.

Another version of the invention as a sorbent canister includes a hollow moisture-impeding plastic body having an open end and a porous plastic sheet fused to the open end of the hollow body. A fused junction is formed between the porous sheet and the open end of the hollow body. A beveled surface formed in the fused junction removes irregularities in the fused junction that could interfere with the automated dispensing of the sorbent canister.

Preferably, the hollow body has a form concentric to an axis, and the beveled surface is inclined to the axis. The beveled surface is preferably inclined to the axis at a chamfer angle of less than 30 degrees, and more preferably, the beveled surface is inclined to the axis at a chamfer angle of approximately 15 degrees.

The porous plastic sheet can be fused to the open end of the hollow body by applying heat and pressure to the sheets against the open end of the hollow body. The open end is preferably a first of a first open end and a second open end, the porous plastic sheet is preferably a first of a first porous plastic sheet and a second porous plastic sheet, and the fused junction is preferably a first of a first fused junction and a second fused junction formed between the first and second open ends and the first and second porous plastic sheets. In addition, the beveled surface is preferably a first of a first beveled surface and a second beveled surface formed in the first and second fused junctions to remove irregularities that could interfere with the automated dispensing of the sorbent canister.

Thus, the invention includes among its objects an improved sorbent canister having at least one porous end thereof that is fused to the hollow body at a junction, and a beveled surface that is formed in the fused junction to avoid interference problems with automated dispensing equipment. The canister can contain a gas or vapor treating material that adsorbs moisture or absorbs other gases such as oxygen. Another object of the invention is to provide an improved method for making such a canister having a porous end with beveled surface.

The various aspects of the present invention will be more fully understood when the following portions of the specification are read in conjunction with the accompanying drawings.

BRIEF DESCRIPTION OF THE DRAWING FIGURES

DETAILED DESCRIPTION OF THE INVENTION

Figure 1:
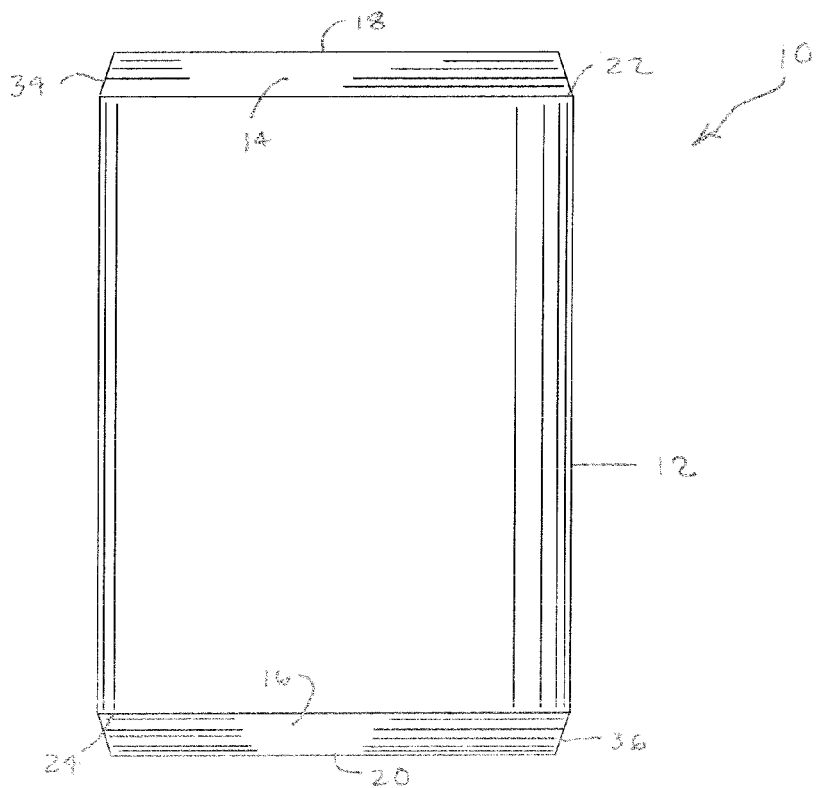
FIG. 1 is an enlarged side-elevational view of the improved canister of the present invention.
Figure 2:
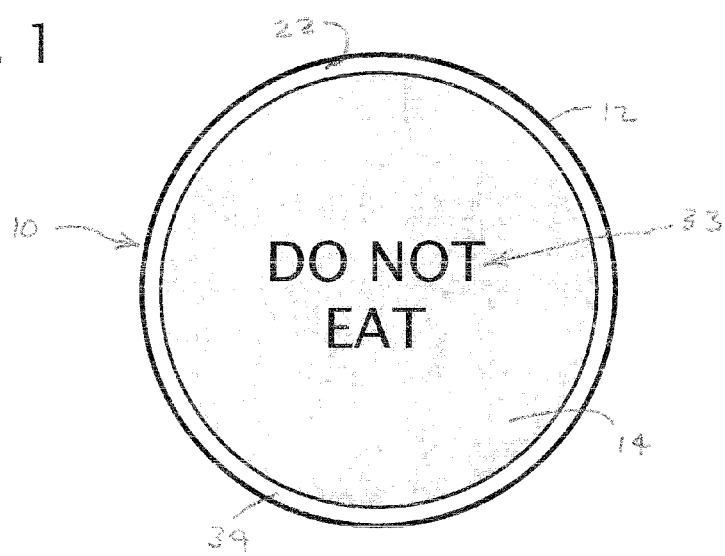
FIG. 2 is a similarly enlarged top view of the canister showing a porous end of the canister.
Figure 3:
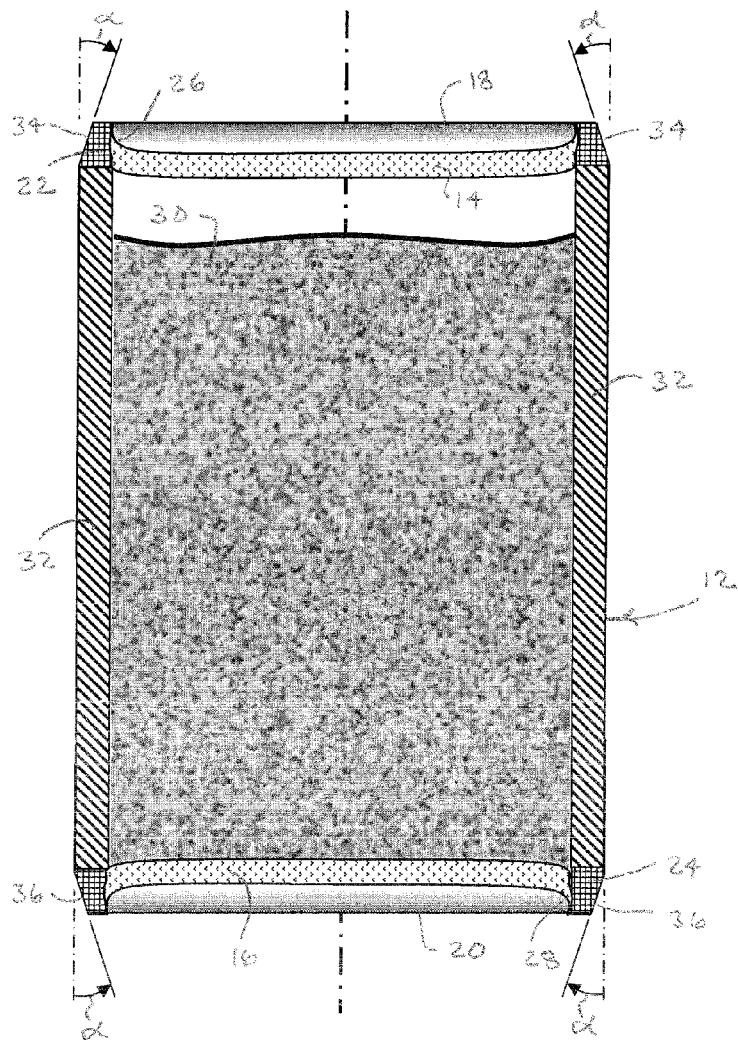
FIG. 3 is an enlarged cross-sectional view of the canister with beveled ends.

An improved gas or vapor treating canister 10 of the present invention, as depicted in FIGS. 1 and 2, includes a hollow body 12 that is made of high density polyethylene and has a generally cylindrical shape and porous closure members 14 and 16 (i.e., end caps) that are made of a porous high-density polyethylene. The porous closure members 14 and 16 are bonded to otherwise open ends 18 and 20 of the hollow body 12. As more clearly seen in FIG. 3, the porous closure members 14 and 16 are bonded to the open ends 18 and 20 of the hollow body at junctions 22 and 24 by a fusion operation such as vibratory or hot tool welding. The canister 10 is filled with a granular material 30 that can adsorb or absorb, excess moisture, oxygen, odors, or other gas transportable material for which the sorbent material is designed to remove from its immediate environment.

When fused by heat, the porous closure members 14 and 16 are recessed within the open ends 18 and 20 of the hollow body 12. At the fused junctions 22 and 24, small meniscuses 26 and 28 are formed against a surrounding wall 32 of the hollow body 12, evidencing the temporary plastic state of the porous closure members 14 and 16 at the fusion sites. Text message 33 printed on the exposed surface of the porous closure members 14 and 16 at the opposite ends of the gas or vapor treating canister 10 provides a warning that further distinguishes the canister 10 from product with which the container may be mixed during use.

Figure 4:
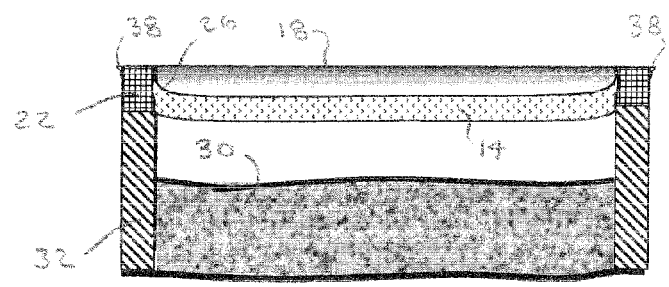
FIG. 4 is an enlarged fragmentary side cross-sectional view of the filled canister prior to a chamfering operation for forming the beveled ends.

In accordance with this invention, beveled surfaces 34 and 36 are preferably formed in the fused junctions 22 and 24 to assure the removal of any excess material in the junctions 22 or 24. For example, as shown in FIG. 4 prior to a chamfering operation that forms the beveled surfaces 34 and 36, an untrimmed edge 38 at the fusion site extends beyond the intended perimeter of the hollow body 12. The untrimmed edge 38 can interfere with the intended dispensing of the canister into a product packaging, such as a pill bottle.

The beveled surfaces 34 and 36, whose formation removes the untrimmed edge 38, are inclined through an angle $\alpha$ with respect to a central axis 40 of the hollow body 12. In mathematical terms, the periphery of the hollow body 12 is generated by a line revolving around the central axis 40. The bevel angle $\alpha$ is preferably inclined no more than 30 degrees and optimally around 15 degrees to that axis 40, so that, in the formation of the beveled surfaces 34 and 36, more material is removed in a longitudinal direction along the central axis 40 corresponding to a height dimension of the hollow body 12 than in a radial direction toward the central axis 40 corresponding to a width dimension of the hollow body 12. Since the hollow body 12 is indeed hollow for functioning as a container, the surrounding wall 32 of the hollow body 12 has a limited thickness dimension, which is protected from breach by the relatively steep bevel angle α.

The beveled surfaces 34 and 36 are preferably straight sided as conic sections to exploit the steep bevel angle α for relatively reducing the impact on the remaining wall thickness of the hollow body 12. The beveled surfaces could also be formed in other shapes including shapes with curvilinear or otherwise rounded sides.

The manufacture of the canister 10 up to and including the just-mentioned chamfering operation for forming the beveled surfaces 34 and 36 is described in more detail through the remaining drawing figures. The first step in the process is to provide the hollow bodies 12.

Figure 5:
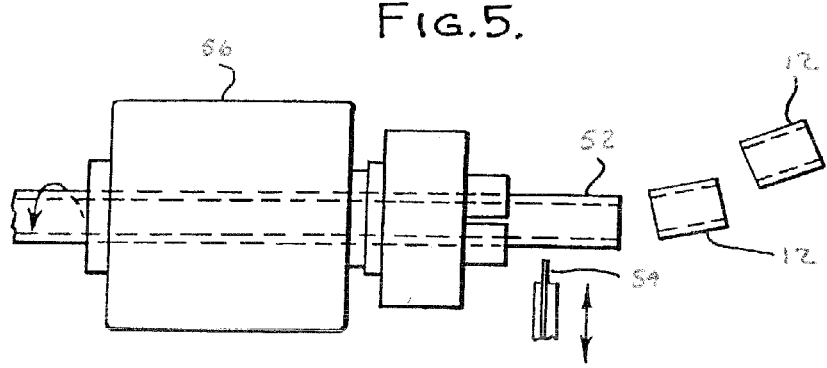
FIG. 5 is a schematic fragmentary plan view showing a tube being cut into lengths for providing the bodies of the canisters.
Figure 6:
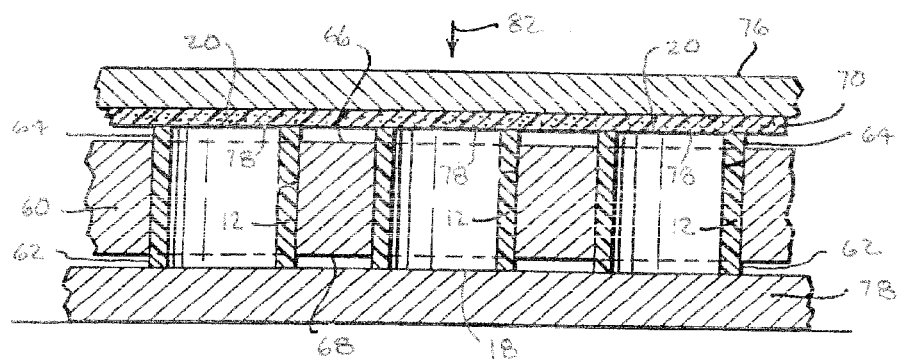
FIG. 6 is a schematic fragmentary side elevational view in cross section depicting the next step in fabricating the canisters by attaching porous ends to the first ends of the canisters by fusion welding after they have been placed in a fixture.

As shown in FIG. 5, the hollow bodies 12 can be obtained by cutting an extruded high-density polyethylene tube 52 into the bodies 12 by means of a suitable cutting blade 54 associated with a tube rotating and advancing device 56, or the hollow bodies 12 can be obtained in any other suitable manner. The next step, as shown in FIG. 6, is to press fit the hollow bodies 12 into a fixture 60 (such as in groups of 20 hollow bodies) with only very small end portions 62 and 64 at the ends 18 and 20 of hollow bodies 12 protruding beyond the surfaces 66 and 68 of the fixture 60. This causes the bodies 12 to be held securely during the subsequent welding operations. Thereafter, a sheet 70 of porous high-density polyethylene is laid across the open ends 18 and 20 of hollow bodies 12. Sheet 70 can have a matte surface and a shiny surface. Preferably, the matte surface of sheet 70 is placed in a contiguous relationship to the open ends 20 of hollow bodies 12, but the shiny surface could also be placed against the ends 20 of the bodies 12. Thereafter, a heated welding die 76 is applied to sheet 70 with sufficient heat and pressure to fuse together overlapping portions of the sheet 70 and the hollow bodies 12 at the fused junctions 24. The welding dye 76 is preferably formed from a rectangular bar of specialty steel (P20) with a hole formed along a longitudinal axis for inserting a cartridge fire rod. Another hole can be formed for inserting a thermocouple to provide feedback to a controller for maintaining the welding dye 76 at a desired temperature.

Although not apparent in FIG. 6, heat from the welding die 76 temporarily softens the sheet 70 in the vicinity of the fused junctions 24 so that uncompressed central portions 78 of the sheet 70 are drawn into the interior of the hollow bodies 12 and are joined with the meniscuses 28 (see FIG. 3) to the sidewalls 32 of the hollow bodies 12 at the fused junctions 24. The protruding end portions 62, which are opposite to the ends 20 to which the welding die 76 is first applied, are supported by a base portion 78 associated with fixture 60.

Preferably, the welding die 76 applies pressure in the direction of arrow 82 to the sheet 70 against the ends 20 of the hollow bodies 12 between 600 and 1000 pounds per square inch, at a temperature of around 500 degrees Fahrenheit, and for a period of about 1 to 2 seconds. Porous plastic sheet 70 is sufficiently stiff so that it will not buckle when subjected to the pressure. It is this combination of temperature and pressure that produces the fused junctions 24 for securely attaching portions of the porous plastic sheet 70 to the open ends 20 of the hollow bodies 12.

Figure 7:
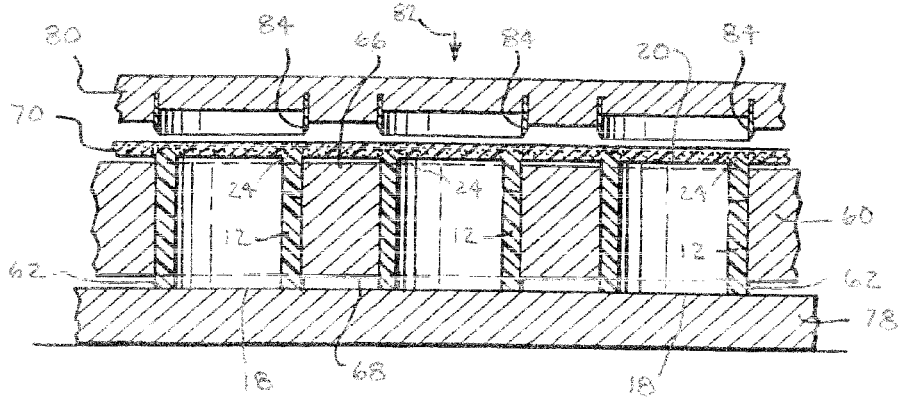
FIG. 7 is a view similar to FIG. 6 but showing the next step in the process, namely, trimming excess porous materials away from the ends of the canisters.

After the porous plastic sheet 70 has been bonded to the plurality of hollow bodies 12, a trimming die 80 is applied to the sheet 70, as depicted in FIG. 7, and excess material of sheet 70 beyond the peripheries of the hollow bodies 12 is trimmed away. As also shown in FIG. 7, the trimming die 80 contains a plurality of circular knives 84, which trim away the excess material of sheet 70 that lies outside of the ends 20.

Figure 8:
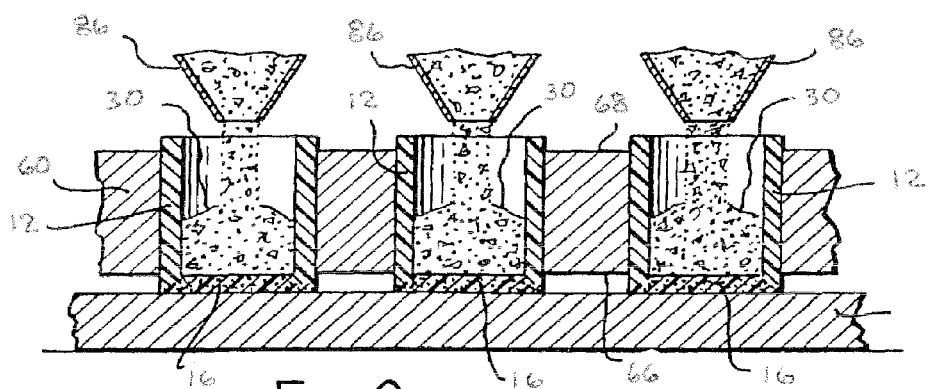
FIG. 8 is a schematic view in cross section showing the next step, namely, filling the open ends of the canisters with gas or vapor treating material.
Figure 9:
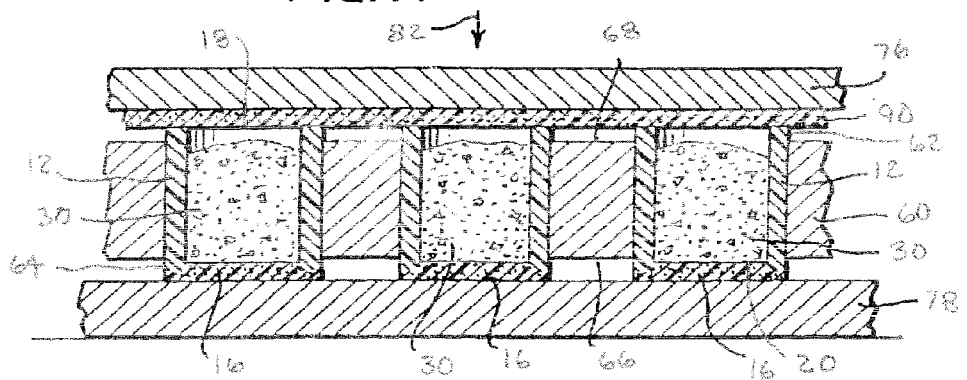
FIG. 9 is a view similar to FIG. 6 and showing the next step, namely, bonding porous members to the opposite ends of the canister bodies after they have been filled with gas or vapor treating material.
Figure 10:
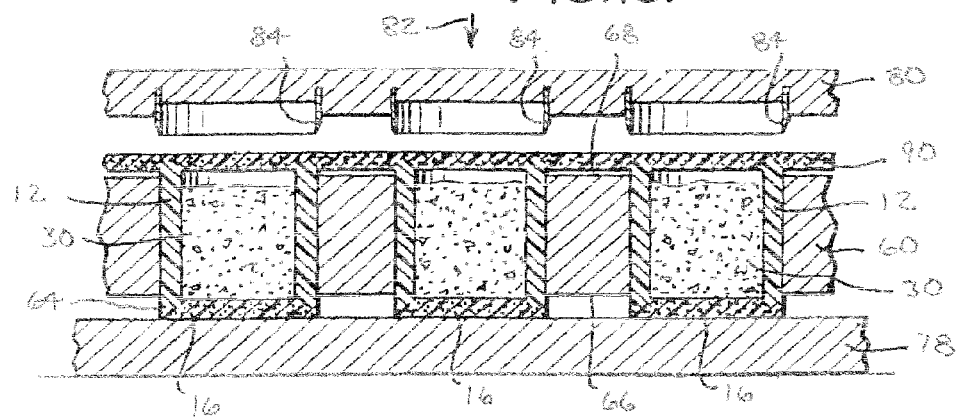
FIG. 10 is a view similar to FIG. 7 and showing the excess porous material being trimmed from the ends of the canisters.

The next steps of the process as shown in FIG. 8 include (a) inverting the processed bodies 12 by inverting the fixture 60 in which they are held and (b) filling the bodies 12 with the granular material 30 from a source such as hoppers 86. Thereafter, as shown in FIG. 9, another sheet 90 of porous high density plastic material is placed across the open ends 18 of bodies 12, and the heated welding die 76 applies heat and pressure depicted by arrow 82 to the top of the plastic sheet 90 to thereby form fused junctions 22 with the ends 18 of the hollow bodies 12 similar to the way the fused junctions 24 were formed as described above with reference to FIGS. 6 and 7. During this procedure, the opposite ends 20 of bodies 12, which were previously closed with porous ends 16, are supported on the base portion 78 of the fixture 60. Thereafter, as shown in FIG. 10, the trimming die 80 is lowered in the direction of arrow 82 to trim the excess porous material of the sheet 70 from the fused junctions 22 of bodies 12.

The hollow bodies 12 are preferably made of a high-density polyethylene. The bodies 12 can have an outer diameter of approximately 0.55 inches, a length of approximately 0.630 inches, and a wall thickness of approximately 0.035 inches. In addition, the hollow bodies 12 are preferably fabricated from a product known as Marlex® HHM 5202BN, a FDA grade high-density polyethylene from Chevron Phillips Chemical Company of The Woodlands, Tex. When the hollow bodies 12 are properly positioned within bores of fixture 60, the hollow bodies 12 can protrude about 0.030 inches at each end.

The sheets 70 and 90 are preferably made of porous high-density polyethylene appropriate for use in food or drug packaging. The sheets 70 and 90 are preferably 0.028 inches thick plus or minus around 0.005 inches. The porous sheets 70 and 90 can support airflows of 40 to 120 cubic feet per minute per square foot of area or 1400-4200 milliliters per minute through a one-inch diameter disc at a pressure of 1.2 inches of water. The sheets 70 and 90 have a preferred tensile strength of at least 215 pounds per square inch and should be sufficiently stiff so that the sheets 70 and 90 will not buckle when subjected to the forces encountered during the intended welding operations. Other values for tensile strength are possible depending on the desired application. Examples of such materials are available as roll stock from Porvair Technology of Wrexham, UK as Porvair PRLF094230, Porex Technologies of Fairburn, Ga. as Porex Porous Products Group X-8054 or X-9474, or Micropore Plastics, Inc. of Tucker, Ga. as Micropore 3021. Other porosities can be used, depending on the specific requirements of any particular application.

Each of the porous closure members 14 and 16 can retain the 0.028-inch sheet thickness dimension in the central portions 78, which are drawn into the hollow bodies 12. However, the fused outer portions can be compressed within the fused junctions 22 and 24 as a result of the above-described heat welding under pressure. Other types of porous polyethylene or other resins can be used for similar purposes.

The heat welding process described above utilizes a clamping force or pressure of between about 600 to 1000 pounds per square inch, and it includes a cycle time of approximately 4 to 5 seconds, which includes a heating time of approximately 1 to 2 seconds. The foregoing heat welding process causes fusion between the porous closure members 14 and 16 and the ends 18 and 20 of the hollow bodies 12 at the fused junctions 22 and 24. This fusion is obtained because interface areas of both the closure members 14 and 16 and the hollow bodies 12 melt at substantially the same time under the foregoing circumstances notwithstanding their differences in porosity.

Other bonding processes could also be used for attaching the closure members 14 and 16 to the hollow bodies, including vibratory welding processes such as disclosed in co-assigned U.S. Pat. No. 5,942,060, which is hereby incorporated by reference.

The hollow bodies 12 can be made of other resins of polyethylene and in other sizes, which includes other diameters, other lengths, and other wall thicknesses. As noted above, the porous high-density polyethylene, which is used for closure members 14 and 16, can be made in other stiffnesses, other thicknesses, and other porosities. The changes in parameters of the hollow bodies 12 and closure members 14 and 16 can require changes in the heat welding parameters.

One of the preferred granular materials 30 is a white silica gel having a particle size of about 0.5-1 millimeter available from Ineos Silicas Ltd. of Warrington, United Kingdom, and the canisters 10 containing such silica gel are intended for use in adsorbing moisture in various environments, such as pharmaceutical containers, food containers, and in any other environments where moisture adsorption is desired. Other types of granular or non-granular gas or vapor treating material can be used, including by way of example and not of limitation such materials as activated charcoal, molecular sieve, activated bentonite, montmorillonite, calcium sulfate, and Clintolite and crystalline metal aluminosilicates. The canisters can also contain any other suitable product, including but not limited to conventional oxygen absorbing compositions and conventional carbon dioxide absorbing compositions. The foregoing products absorb or adsorb gases from the environments in which the canisters 10 are placed. However, the canisters 10 can also contain products that produce vapors, which pass into the environment in which the canisters are located, and such vapors, by way of example and not of limitation, include fragrances and carbon dioxide. Therefore, the material within the canister body 12 will be characterized as "gas or vapor treating."

In addition to the foregoing, while the specific material of canister 10 has been described above as being high-density polyethylene, it is to be understood that polypropylene can also be used for both the body 11 and the porous member 14, and the parameters for effecting the heat welding can be adjusted accordingly. It is also believed that other resins may be used to provide canisters of the type depicted in FIGS. 1-4, wherein the porous closures members 14 and 16 are bonded at multiple annular locations as described above. These other resins, by way of example and not of limitation, can include nylon, polyvinylidene fluoride (PVDF), polytetrafluoroethylene (PTFE), styrene-acrylonitrile (SAN), polysulfone (PS), ethylene-vinyl acetate (EVA), polycarbonate (PC), polyphthalate carbonate (PPC) and polyether sulfone (PES).

While the canister 10 has been described above as having two porous end members 14 and 16, it will be appreciated that the canister 10 can be fabricated with only one porous end member, such as 14 of 16, and with another end that is not porous, and the other end member can be formed integrally with the body or attached thereto. Also, while the canister 10 has been described as containing a gas or vapor treating composition, it is believed that it has general applicability irrespective of its contents. In this respect, for example, it may contain a product which must be allowed to breathe but which does not otherwise absorb, adsorb, or in any other way interact with gases or vapors outside of the canister 10.

Figure 11:
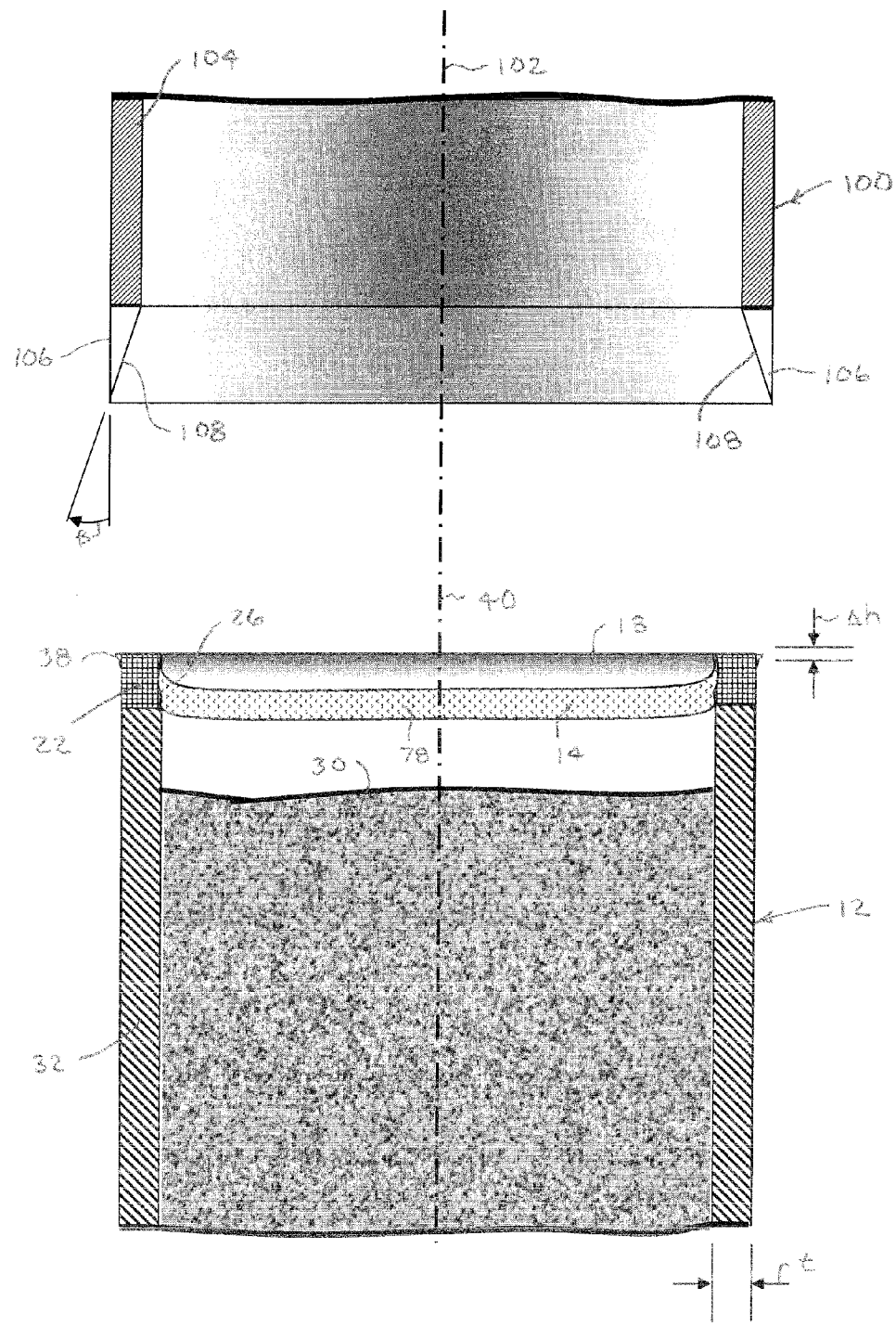
FIG. 11 is an enlarged fragmentary side cross-sectional view of the filled canister and a chamfering tool aligned along a common axis.

Following the trimming operations or in conjunction with or in place of the trimming operations, a chamfering tool 100, as shown in FIG. 11, can be used to form the beveled surfaces 34 and 36 in the fused junctions 22 and 24 at the opposite ends of the canister 10. The formation of the beveled surfaces 34 and 36 assures the removal of any untrimmed edges 38 at the ends of the canisters 10 that extend beyond the intended perimeters of the hollow bodies 12 and that could interfere with the dispensing of the completed canisters 10.

The chamfering tool 100 is preferably rotatable about an axis 102 aligned with the central axis 40 of the hollow bodies 12 and includes a cylindrical body 104 and cutting blades 106 angularly spaced around the rotational axis 102. In addition, the chamfering tool 100 is preferably relatively translatable with respect to the canisters 10 along the rotational axis 102 and the central axis 40 for feeding the chamfering tool 100 into engagement with the fused junctions 22 and 24 of the canister 10. Cutting edges 108 of the cutting blades are preferably inclined to the rotational axis 102 through an angle $\beta$ for forming the beveled surfaces 34 and 36 at corresponding chamfer angles $\alpha$.

Preferably, the chamfer angles $\alpha$ are less than 30 degrees. Even more preferably, the beveled surfaces 34 and 36 are inclined by chamfer angles of only approximately 15 degrees. The shallow chamfer angles $\alpha$ assure that the chamfering operation does not compromise a wall thickness "t" of the hollow body 12 despite height variations in the canisters 10. For example, a chamfer angle $\alpha$ at 15 degrees can accommodate nearly four times the hollow body height variation "$\Delta h$" as more conventional chamfer angles at 45 degrees. A tool stop can be referenced with respect to the fixture 60 to set the cutting depth of the chamfering tool 100. Two cutting blades 106 per tool are preferred. Rotational speeds of between 700 and 1500 revolutions per minute (RPM) are also preferred. The vertical feed of the chamfering tool 100 along the rotational axis 102 is preferably variable in speed to provide a rapid approach but slower feeds during cutting.

Either the chamfering tool 100 can be translated between canisters 10 or multiple chamfering tools 100 can be used for chamfering the ends of the plurality of canisters 10 within the fixture 60. Multiple chamfering tools 100 could also be used together with individual or collective translation of the multiple chamfering tools 100 to index the chamfering tools between canisters 10. For example a five-head spindle could be used for chamfering 5 canister ends at one time, and the entire five-head spindle could be indexed to chamfer another set of five canister ends within the same fixture 60. The chamfering tools 100 can be used in addition to or as a replacement for the trimming dye 80. That is, the chamfering tools 100 can be used (a) to cut through the porous sheets 70 and 90 for separating the canisters 10 from the sheets 70 and 90 and (b) to continue cutting (i.e., relatively translating along the rotational axis 102) to form the beveled surfaces 34 and 36 at the fused junctions 22 and 24.

Once the canisters 10 are separated and chamfered, the ends are preferably printed with the warning message 33, visually inspected, and ejected from the fixture 60 as competed canisters 10. The new canisters 10 with beveled surfaces 34 and 36 can be dispensed into product packaging with greater confidence that the dispensing will not be impeded by peripheral edges resulting from manufacture.

While preferred embodiments of the present invention have been disclosed, it will be appreciated that it is not limited thereto but may be otherwise embodied within the scope of the following claims.

The invention claimed is:

1. A method of fabricating a sorbent canister comprising the steps of overlaying a first porous plastic sheet across a first open end of a hollow plastic body, fusing the first sheet to the first open end of the hollow body for forming a first end of the canister by a portion of the first sheet that is surrounded by a first fused junction between the first sheet and the first open end of the hollow body, trimming away a remaining portion of the first sheet that extends beyond the first fused junction for separating the canister from the remaining portion of the body, and chamfering the first fused junction for beveling the first end of the canister.

2. The method of claim 1 in which the hollow body has a form concentric to an axis, and the step of chamfering includes forming in the first end of the canister a beveled surface inclined to the axis.

3. The method of claim 2 in which the step of chamfering includes rotating a tool around the axis.

4. The method of claim 3 in which the tool has blades that are angularly spaced around the axis.

5. The method of claim 2 in which the step of chamfering includes forming the beveled surface to the axis at a chamfer angle of less than 30 degrees.

6. The method of claim 2 in which the step of chamfering includes forming the beveled surface to the axis at a chamfer angle of approximately 15 degrees.

7. The method of claim 1 including a steps of inverting the canister, filling the canister, overlaying a second porous plastic sheet across a second open end of the hollow plastic body, and fusing the second sheet to the second open end of the hollow body forming a second end of the canister.

8. The method of claim 7 including a step of trimming away a surrounding portion of the second sheet that extends beyond a second fused junction for separating the canister from the second sheet.

9. The method of claim 8 including a step of chamfering the second fused junction for beveling the second end of the canister.

10. The method of claim 7 in which the steps of fusing the first and second sheets include applying heat and pressure to the first and second sheets against the first and second open ends of the hollow body.

11. The method of claim 7 in which the hollow plastic body is a first of a plurality of hollow plastic bodies, and including steps of mounting the plurality of hollow bodies in a common pallet, aligning second open ends of the hollow bodies within the pallet to a common reference, and fusing the first sheet to the first open ends of the hollow bodies for forming first fused junctions at first ends of the canisters.

12. The method of claim 11 in which the step of trimming includes collectively trimming away remaining portions of the first sheet that extend beyond the first fused junctions for separating the canisters from the remaining portions of the first sheet.

13. The method of claim 12 in which the step of chamfering includes collectively chamfering the first fused junctions for beveling the first ends of the canisters.

14. The method of claim 13 including steps of inverting the pallet, aligning the first ends of the canisters to a common reference, filling the canisters, fusing the second sheet to second open ends of the hollow bodies for forming second fused junctions at second ends of the canisters, collectively trimming away remaining portions of the second sheet that extend beyond the second fused junctions for separating the canisters from the remaining portions of the second sheet, and collectively chamfering the second fused junctions for beveling the second ends of the canisters.

15. The method of claim 1 in which the steps of trimming and chamfering are performed in a single operation.

16. The method of claim 15 in which a rotary cutting tool provides for both trimming away the remaining portion of the first sheet and chamfering the first fused junction for beveling the first end of the canister.

17. The method of claim 1 in which the steps of trimming and chamfering are performed in separate operations.

18. The method of claim 17 in which the steps of trimming and chamfering are carried out using different tools.

\* \* \* \* \*